United States Patent
Archer et al.

(10) Patent No.: US 11,528,789 B2
(45) Date of Patent: Dec. 13, 2022

(54) NEGATIVE INJECTION FOR POWER FACTOR CORRECTION CIRCUIT PERFORMANCE ENHANCEMENTS

(71) Applicant: ERP POWER, LLC, Moorpark, CA (US)

(72) Inventors: Michael Archer, Moorpark, CA (US); Louis Chen, Simi Valley, CA (US)

(73) Assignee: ERP POWER, LLC, Moorpark, CA (US)

( * ) Notice: Subject to any disclaimer, the term of this patent is extended or adjusted under 35 U.S.C. 154(b) by 0 days.

(21) Appl. No.: 17/393,901

(22) Filed: Aug. 4, 2021

(65) Prior Publication Data

US 2022/0086984 A1  Mar. 17, 2022

Related U.S. Application Data

(60) Provisional application No. 63/078,031, filed on Sep. 14, 2020.

(51) Int. Cl.
*H05B 45/355* (2020.01)
*H02M 1/42* (2007.01)
*H05B 45/3725* (2020.01)

(52) U.S. Cl.
CPC ........ *H05B 45/355* (2020.01); *H02M 1/4225* (2013.01); *H02M 1/4283* (2021.05); *H05B 45/3725* (2020.01)

(58) Field of Classification Search
CPC ...... H05B 45/24; H05B 45/355; H05B 45/37; H05B 45/3725; H05B 45/375; H05B 45/38; H05B 45/3832; H05B 45/385; H02M 1/4283; H02M 1/4225; H02M 1/422508
See application file for complete search history.

(56) References Cited

U.S. PATENT DOCUMENTS 8,461,774 B2 * 6/2013 Nerone .................. H05B 45/37
   315/297
2012/0286696 A1 * 11/2012 Ghanem ............ H05B 45/3725
   315/291

FOREIGN PATENT DOCUMENTS

WO    WO-2017066496 A1 *  4/2017

* cited by examiner

*Primary Examiner* — Abdullah A Riyami
*Assistant Examiner* — Syed M Kaiser
(74) *Attorney, Agent, or Firm* — Lewis Roca Rothgerber Christie LLP

(57) ABSTRACT

A negative injection circuit is coupled to a power factor correction (PFC) controller of a power supply system and includes a downshifter configured to downshift a ground signal to generate a negative voltage signal, a variable impedance coupled between the downshifter and the PFC controller, and configured to inject a negative injection voltage into a voltage sampling input of the PFC controller, the variable impedance including a first current limiting resistor and a second current limiting resistor coupled in series with one another and between the downshifter and the voltage sampling input of the PFC controller, and a bypass switch configured to selectively short across the second current limiting resistor in response a range selection signal.

20 Claims, 5 Drawing Sheets

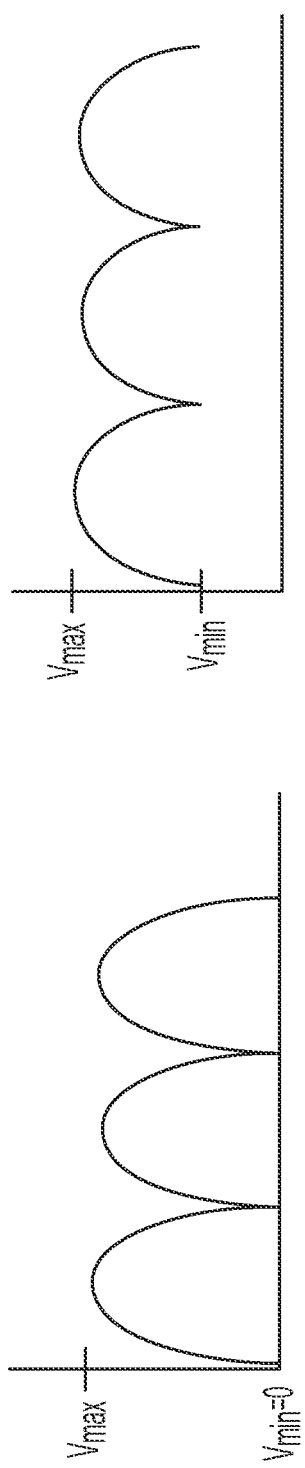
FIG. 2A
FIG. 2B
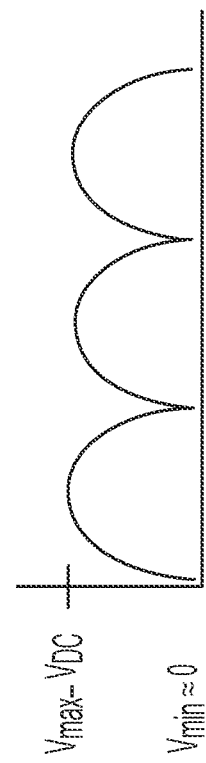
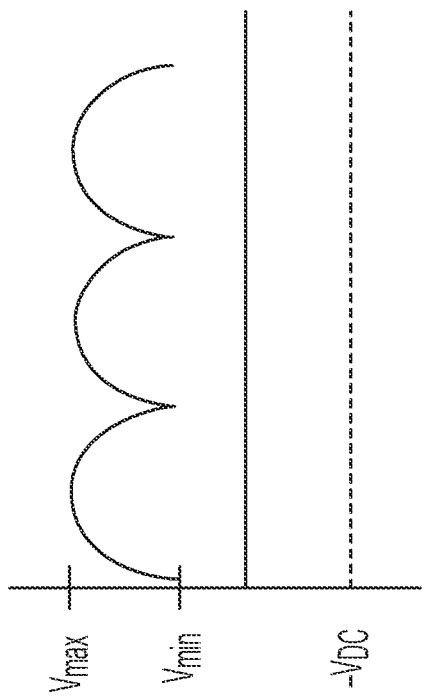
FIG. 2C
FIG. 2D

NEGATIVE INJECTION FOR POWER FACTOR CORRECTION CIRCUIT PERFORMANCE ENHANCEMENTS

CROSS-REFERENCE TO RELATED APPLICATION(S)

This application claims priority to, and the benefit of, U.S. Provisional Application No. 63/078,031 ("NEGATIVE INJECTION FOR MULTIPLIER PERFORMANCE ENHANCEMENTS"), filed on Sep. 14, 2020, the entire content of which is incorporated herein by reference.

FIELD

Aspects of the present invention are related to power supply systems for light sources.

BACKGROUND

In current LED lighting applications, LED drivers are generally required to provide a PFC (power factor correction) function, that is, to make an input current in phase with a full-wave-rectified line input voltage. The PFC circuits are often designed for a particular line input voltage range. Some universal input voltage LED drivers use a circuit that selects between two reference signal gain levels for low-line and high-line input voltage operation. However, it may be difficult to meet industry standard requirements for total harmonic distortion (THD) and power factor (PF) across all input voltages and load conditions.

The above information disclosed in this Background section is only for enhancement of understanding of the invention, and therefore it may contain information that does not form the prior art that is already known to a person of ordinary skill in the art.

SUMMARY

Aspects of embodiments of the present invention are directed to a power supply system including a negative injection circuit configured to inject a negative voltage to the reference input on the PFC Controller that shifts the signal sampled by the PFC controller downward so that the valleys of the sampled haversine signal reach zero or close to zero. In some embodiments, the negative injection circuit automatically adjusts the magnitude of the voltage that is injected into the reference input when operating at different AC line voltages. Further, the negative injection serves to reduce common mode noise to the multiplier pin when operating at low output levels.

According to some embodiments of the present disclosure, there is provided a negative injection circuit coupled to a power factor correction (PFC) controller of a power supply system, the negative injection circuit including: a downshifter configured to downshift a ground signal to generate a negative voltage signal; a variable impedance coupled between the downshifter and the PFC controller, and configured to inject a negative injection voltage into a voltage sampling input of the PFC controller, the variable impedance including: a first current limiting resistor and a second current limiting resistor coupled in series with one another and between the downshifter and the voltage sampling input of the PFC controller; and a bypass switch configured to selectively short across the second current limiting resistor in response a range selection signal.

In some embodiments, the voltage sampling input of the PFC controller is configured to sample a rectified signal of a rectifier of the power supply system, and the downshifter and the variable impedance are together configured to shift the sampled rectified signal downward by an amount of the negative injection voltage.

In some embodiments, the negative injection voltage has a value of −0.5 V to −1.0 V when the bypass switch is deactivated, and a value of −0.25 V to −0.5 V when the bypass switch is activated.

In some embodiments, the downshifter is configured to receive the ground signal from bias windings of the power supply system.

In some embodiments, the downshifter is coupled to a negative terminal of a primary binding of the bias windings, and the bias windings are configured to derive power from an output of a converter of the power supply system.

In some embodiments, the ground signal is a pulsed signal, and the downshifter is further configured to rectify and filter the pulsed signal to generate a negative voltage that is a DC signal.

In some embodiments, the downshifter includes: a diode configured to rectify the ground signal, and having an anode configured to receive the ground signal and a cathode coupled to the first current limiting resistor; and a capacitor coupled in parallel to the diode and configured to filter the ground signal.

In some embodiments, the bypass switch is coupled in parallel with the second current limiting resistor.

In some embodiments, the bypass switch includes: a first transistor coupled in parallel with the second current limiting resistor and having a gate resistively coupled to a ranging circuit, the first transistor being configured selectively turn on and off in response to the range selection signal from the ranging circuit; and a second transistor coupled between the first transistor and the downshifter and having a gate resistively coupled to a bias supply of the ranging circuit, the second transistor being configured to selectively apply the negative voltage signal from the downshifter to the gate of the first transistor in response to the range selection signal from the ranging circuit.

In some embodiments, the first and second transistors are n-type metal-oxide-semiconductor (NMOS) field effect transistors (FETs).

In some embodiments, the ranging circuit is configured to determine an AC input voltage of the power supply system as being within a first range or a second range, and to generate the range selection signal according to the determination.

In some embodiments, the first range is 100 VAC to 120 VAC, and the second range is 240 VAC to 277 VAC, wherein when the AC input voltage is within the first range, the range selection signal has a first value, and when the AC input voltage is within the second range, the range selection signal has a second value, and wherein the bypass switch is configured to deactivate in response to the range selection signal having the first value, and to activate to short across the second current limiting resistor in response to the range selection signal having the second value.

In some embodiments, a ratio of resistances of the first and second current limiting resistor is 1:1 to 2:1.

According to some embodiments of the present disclosure, there is provided a power supply system including: a power factor correction (PFC) controller configured to reduce a total harmonic distortion and increase a power factor of the power supply system, and having a voltage sampling input configured to sample a rectified signal of a rectifier of the power supply system, and a negative injection circuit coupled to the PFC controller and including: a downshifter configured to downshift a ground signal to generate a negative voltage signal; and a variable impedance coupled between the downshifter and the PFC controller, and configured to inject a negative injection voltage into the voltage sampling input of the PFC controller, the variable impedance including: a first current limiting resistor and a second current limiting resistor coupled in series with one another and between the downshifter and the voltage sampling input of the PFC controller; and a bypass switch configured to selectively short across the second current limiting resistor in response a range selection signal.

In some embodiments, the power supply system further includes: The rectifier configured to rectify an AC input signal to generate the rectified signal.

In some embodiments, the downshifter and the variable impedance are together configured to shift the sampled rectified signal downward by an amount of the negative injection voltage.

In some embodiments, the power supply system further includes: a converter coupled to the PFC controller; and bias windings are configured to derive power from an output of the converter of the power supply system, and having a primary winding and a secondary winding, wherein the downshifter is configured to receive the ground signal from a negative terminal of the primary winding.

In some embodiments, the ground signal is a pulsed signal, and the downshifter is further configured to rectify and filter the pulsed signal to generate a negative voltage that is a DC signal.

In some embodiments, the downshifter includes: a diode configured to rectify the ground signal, and having an anode configured to receive the ground signal and a cathode coupled to the first current limiting resistor; and a capacitor coupled in parallel to the diode and configured to filter the ground signal.

In some embodiments, the power supply system further includes: a ranging circuit configured to determine an AC input voltage of the power supply system as being within a first range or a second range, and to generate the range selection signal according to the determination, wherein the first range is 100 VAC to 120 VAC, and the second range is 240 VAC to 277 VAC, wherein when the AC input voltage is within the first range, the range selection signal has a first value, and when the AC input voltage is within the second range, the range selection signal has a second value, and wherein the bypass switch is configured to deactivate in response to the range selection signal having the first value, and to activate to short across the second current limiting resistor in response to the range selection signal having the second value.

BRIEF DESCRIPTION OF THE DRAWINGS

The accompanying drawings, together with the specification, illustrate example embodiments of the present invention, and, together with the description, serve to explain the principles of the present invention.

FIGS. 2A, 2B, 2C, and 2D illustrate a sampled rectifier output voltage, a sampled rectifier output voltage operating at low loads, a negative DC voltage signal injected into the multiplier pin, and the resulting signal entering multiplier pin, respectively, according to some example embodiments of the present disclosure.

DETAILED DESCRIPTION

The detailed description set forth below is intended as a description of example embodiments of power supply system including a negative injection circuit coupled to a PFC circuit, provided in accordance with the present invention and is not intended to represent the only forms in which the present invention may be constructed or utilized. The description sets forth the features of the present invention in connection with the illustrated embodiments. It is to be understood, however, that the same or equivalent functions and structures may be accomplished by different embodiments that are also intended to be encompassed within the spirit and scope of the invention. As denoted elsewhere herein, like element numbers are intended to indicate like elements or features.

Aspects of the present disclosure are directed to a power supply utilizing a negative injection circuit which ensures that, when performing zero crossing detection by a power factor correction (PFC) controller of the power supply, the sampled rectifier signal reaches zero or approximately zero. In some embodiments, the power supply achieves this by injecting a negative voltage into the reference/voltage sampling input terminal (hereinafter referred to as the reference pin) of the PFC controller. Without injecting this negative voltage, it may become harder to maintain high power factor (PF) and low total harmonic distortion (THD). When operating under light load conditions, the voltage signal which is sampled from the output of the rectifier of the power supply may not fully reach zero since the input filter capacitors may not be able to discharge completely. Thus, the negative injection circuit injects a negative voltage to the reference pin of the PFC controller so that the overall signal entering the pin is that of a shifted haversine signal which has valleys that reach zero or approximately zero. This may improve the PF and THD of the power supply, for example, under light load conditions.

Further, while the output of the rectifier may be a clear haversine signal, once divided down and provided to the PFC controller as a reference signal, it is susceptible to waveform distortion caused by common mode noise at the reference input of the PFC controller. As a result, the divided down reference signal may no longer resemble a haversine signal. Also, the common mode noise may shift the divided down haversine reference upward, such that the valleys of the haversine do not touch zero and the peak may be higher than excepted. Here, the negative injection circuit may serve to reduce common mode noise that enters the reference pin of the PFC controller.

Figure 1:
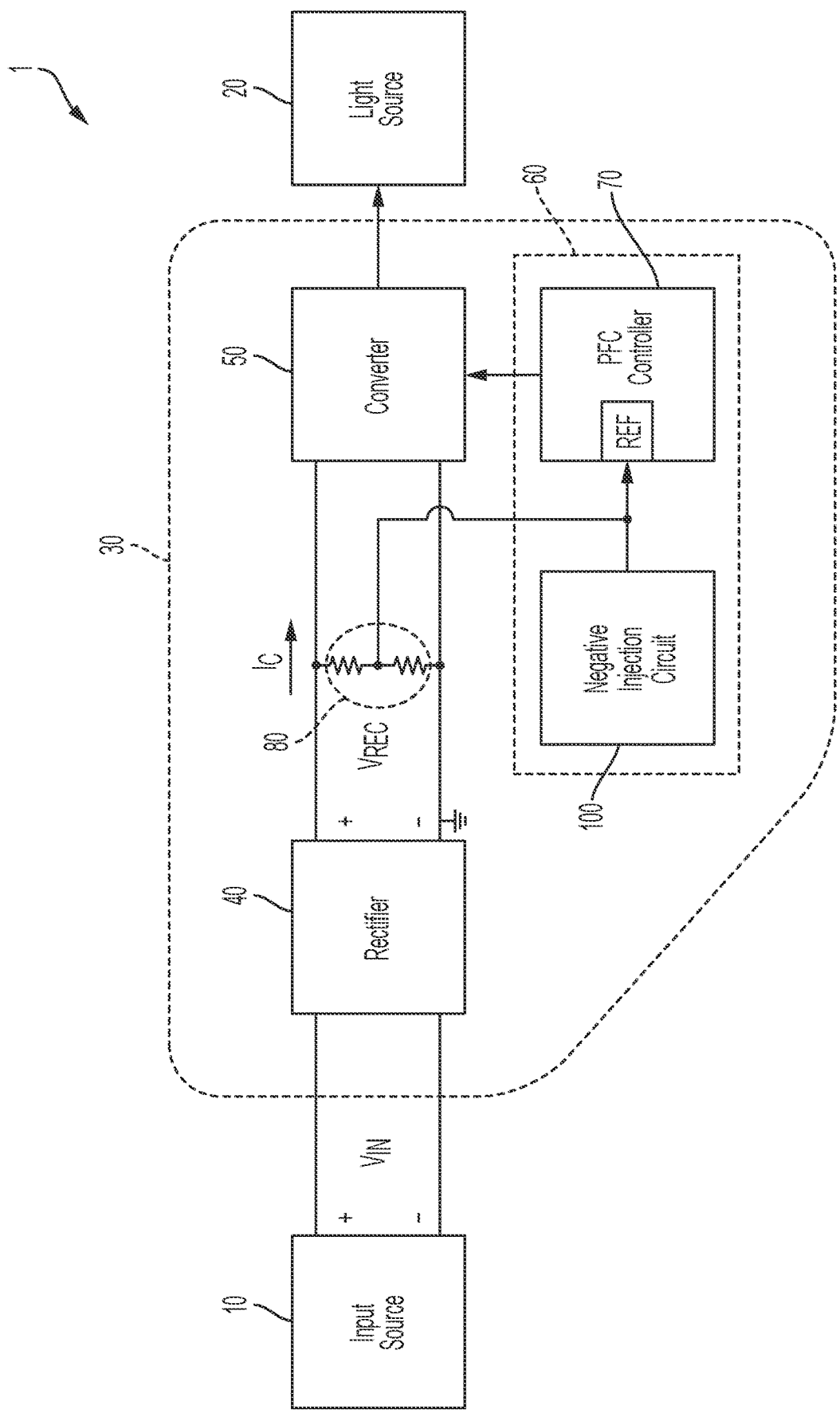
FIG. 1 illustrates a lighting system including a negative injection circuit coupled to a power-factor-correction (PFC) controller, according to some example embodiments of the present disclosure.

FIG. 1 illustrates a lighting system including a negative injection circuit coupled to a power-factor-correction (PFC) controller, according to some example embodiments of the present disclosure.

According to some embodiments, the lighting system 1 includes an input source 10, a light source 20, and a power supply system 30 (e.g., a switched-mode power supply with negative injection) for powering and controlling the brightness of the light source 20 based on the signal from the input source 10.

The input source 10 may include an alternating current (AC) power source that may operate at a 100 Vac (e.g., in Japan), 120 Vac (e.g., in the US), a 240 Vac (e.g., in Europe), or 277 Vac (e.g., in large industrial plants). The input source 10 may also include a dimmer electrically powered by said AC power sources. The dimmer may modify (e.g., cut/chop a portion of) the input AC signal according to a dimmer level before sending it to the power supply system 30, and thus variably reduces the electrical power delivered to the power supply system 30 and the light source 20. In some examples, the dimmer may be a TRIAC or ELV dimmer, and may chop the front end or leading edge of the AC input signal. According to some examples, the dimmer interface may be a rocker interface, a tap interface, a slide interface, a rotary interface, or the like. A user may adjust the dimmer level by, for example, adjusting a position of a dimmer lever or a rotation of a rotary dimmer knob, or the like. The light source 20 may include one or more light-emitting-diodes (LEDs) or an arc or gas discharge lamp with electronic ballasts, such as high intensity discharge (HID) or fluorescent lights.

In some embodiments, the power supply system 30 includes a rectifier 40, a converter (e.g., a DC-DC converter) 50, and a power factor correction (PFC) circuit 60.

The rectifier 40 provides a same polarity of output for either polarity of the AC signal from the input source 10. In some examples, the rectifier 40 may be a full-wave circuit using a center-tapped transformer, a full-wave bridge circuit with four diodes, a half-wave bridge circuit, or a multi-phase rectifier.

The converter 50 converts the rectified AC signal generated by the rectifier 40 into a drive signal for powering and controlling the brightness of the light source 20. The drive signal may depend on the type of the one or more LEDs of the light source 20. For example, when the one or more LEDs of the light source 20 are constant current LEDs the drive signal may be a variable voltage signal, and when the light source 20 requires constant voltage, the drive signal may be a variable current signal. In some embodiments, the converter 50 includes a boost converter for maintaining (or attempting to maintain) a constant DC bus voltage on its output while drawing a current that is in phase with and at the same frequency as the line voltage (by virtue of the PFC circuit 60). Another switched-mode converter (e.g., a transformer) inside the converter 50 produces the desired output voltage from the DC bus.

PFC circuit 60 improves (e.g., increases) the power factor of the load on the input source 10 and reduces the total harmonic distortions (THD) of the power supply system 30. As non-linear loads including the rectifier 40 and the converter 50 distort the current drawn from the input source 10, the PFC circuit 60 counteracts the distortion and raises the power factor. In some examples, other sources of current distortion may be input filter capacitors, input filter chokes, boost inductors, second stage transformers, and any non-linear elements or loads on the secondary side of a transformer inside the converter 50, which would be reflected over to the primary side of the transformer. Further, the main switch (e.g., the transistor) in the boost stage of the converter 50 may also distort the current if it is fed with a constant duty cycle or constant on time. The PFC circuit 60 may be capable of counteracting current distortions regardless of the source.

According to some embodiments, the PFC circuit 60 includes a PFC controller (e.g., the current-mode PFC controller) 70 and a negative injection circuit 100. The PFC controller 70 controls the converter 50 to ensure that the input current IC to the converter 50 matches the waveform of the input voltage $V_{REC}$ generated by the rectifier 40. In so doing, the PFC controller 70 senses a current IC flowing through an inductor of the converter 50 (e.g., the inductor of the boost circuit), and compares this sensed current against the rectified input voltage $V_{REC}$. Based on this comparison, the PFC controller 70 generates a control signal that controls the on-off timing of a switching element in the converter 50 (e.g., the inductor of the boost circuit), which determines the shape of the input current waveform at the converter 50.

In some examples, the PFC controller 70 operates by comparing the sensed inductor current flowing through the converter 50 with the rectified input voltage. As the rectified input voltage $V_{REC}$ may be on the order of 100 V or greater, it is divided down to a safe signal level for the PFC controller 70 by using a resistor voltage divider 80 and fed into the reference input pin REF of the PFC controller 70. The resistor voltage divider 80 includes a first voltage divider resistor $R_{VD1}$ and second voltage divider resistor $R_{VD2}$, which are connected in series between the positive and negative output terminals of the rectifier 40.

When sampling voltage for the multiplier pin, it is desirable for the shape of the rectified input voltage $V_{REC}$ to be preserved as the inductor current of the converter 50 is limited by the sampled voltage which is fed to the reference pin REF of the PFC controller 70. According to some embodiments, the negative injection circuit 100, which is also electrically connected to the reference pin REF of the PFC controller 70, helps to preserve the voltage signal which enters the reference pin REF. This, in turn, allows the power supply system 30 to maintain proper power factor and low total harmonic distortion (THD) of the input line current.

Without the negative injection circuit 100, an issue may arise when operating the power supply system 30 at low loads where insufficient current is drawn by the load to fully discharge input filter capacitors that are incorporated in the converter 50 to hold the voltage up. The input filter capacitors serve to hold the voltage and it is desirable for them to be fully discharged prior to the next cycle of the rectified voltage.

FIGS. 2A, 2B, 2C, and 2D illustrate a sampled rectifier output voltage $V_{REF}$, a sampled rectifier output voltage operating at low loads, a negative DC voltage signal $-V_{DC}$ injected into the multiplier pin, and the resulting signal entering multiplier pin, respectively, according to some example embodiments of the present disclosure.

When the power supply system 30 operates with an AC input signal, the output voltage of the rectifier 40 may be the positive portion of the AC input signal, that is a haversine signal. This rectified signal has a voltage maximum $V_{max}$ which occurs at the peak of the waveform and a voltage minimum which touches zero at its lowest point (see FIG. 2A).

As input filter capacitors are used to hold the rectified input voltage up, at low loads, there is not enough current drawn by the load to fully discharge these input filter capacitors. As a result, the output voltage of the rectifier is that of a rectified voltage with valleys that may not fully reach zero at their lowest point (see FIG. 2B). Their minimum voltage may be a value labeled $V_{min}$, which is greater than zero. Throughout this disclosure, low load may be defined as loads below 20% of the rated maximum output power of the converter 50.

According to some embodiments, the negative injection circuit is configured to inject a negative voltage ($-V_{DC}$) into the reference pin REF of the PFC controller 70, which also receives the sampled output voltage from the rectifier 40 (see FIG. 2C). The resulting waveform that is applied to the reference pin REF is a sum of the negative DC voltage and the sampled output voltage from the rectifier 40. The injection of the negative DC voltage, $-V_{DC}$, serves to shift the sampled signal downward so that the lowest voltage of the rectified signal reaches zero or approximately zero. The resulting peak of the rectified signal then becomes the maximum value $V_{max}$ minus the $V_{DC}$ injected by the negative injection circuit 100 (see FIG. 2D). In some examples, the resulting shifted waveform may be further scaled to compensate for any loss in peak voltage, for example, using a voltage-controlled resistor circuit. In some examples, the maximum value $V_{max}$ at the reference pin may be about 1.0 V to about 3.5 V (e.g., 1.25 V), the minimum voltage $V_{min}$ may be about 0 V to about 0.5 V, and the negative injection voltage $-V_{DC}$ may be about −1.0 V to about −0.25 V.

According to some embodiments, the downshifting of the sampled rectified signal by the negative injection circuit 100 ensures that the power supply system 30 is able to operate efficiently by keeping the inductor current of the converter 50 in-phase and at the same fundamental frequency as the sampled rectifier voltage, thus providing a high power factor and low THD.

Further, in some embodiments, the negative injection circuit 100 may also eliminate or substantially reduce the common mode noise which may be present in the output of the rectifier 40. The common mode noise may be primarily high frequency noise that is received from outside interference, which may be picked up by the PCB on which the power supply system 30 is manufactured. The common mode noise may travel from the positive and negative terminals of the rectifier 40 into the reference pin REF of the PFC controller 70. Also, when the power supply system 30 is operating at low output levels, the on time of the PFC controller may be lowered and high frequency switching at the converter 50 may increase. An increase in high frequency switching may induce more common mode noise that is observed entering the reference pin REF of the PFC controller 70. Because injecting a negative voltage to the reference pin REF to shift the sampled rectifier output voltage $V_{REC}$ ensures that the power supply system 30 is able to operate efficiently (by keeping the inductor current of the converter 50 in phase and of the same fundamental frequency as the sampled rectifier voltage), high frequency switching at the converter 50 may decrease, which may result in less common mode noise.

Figure 3A:
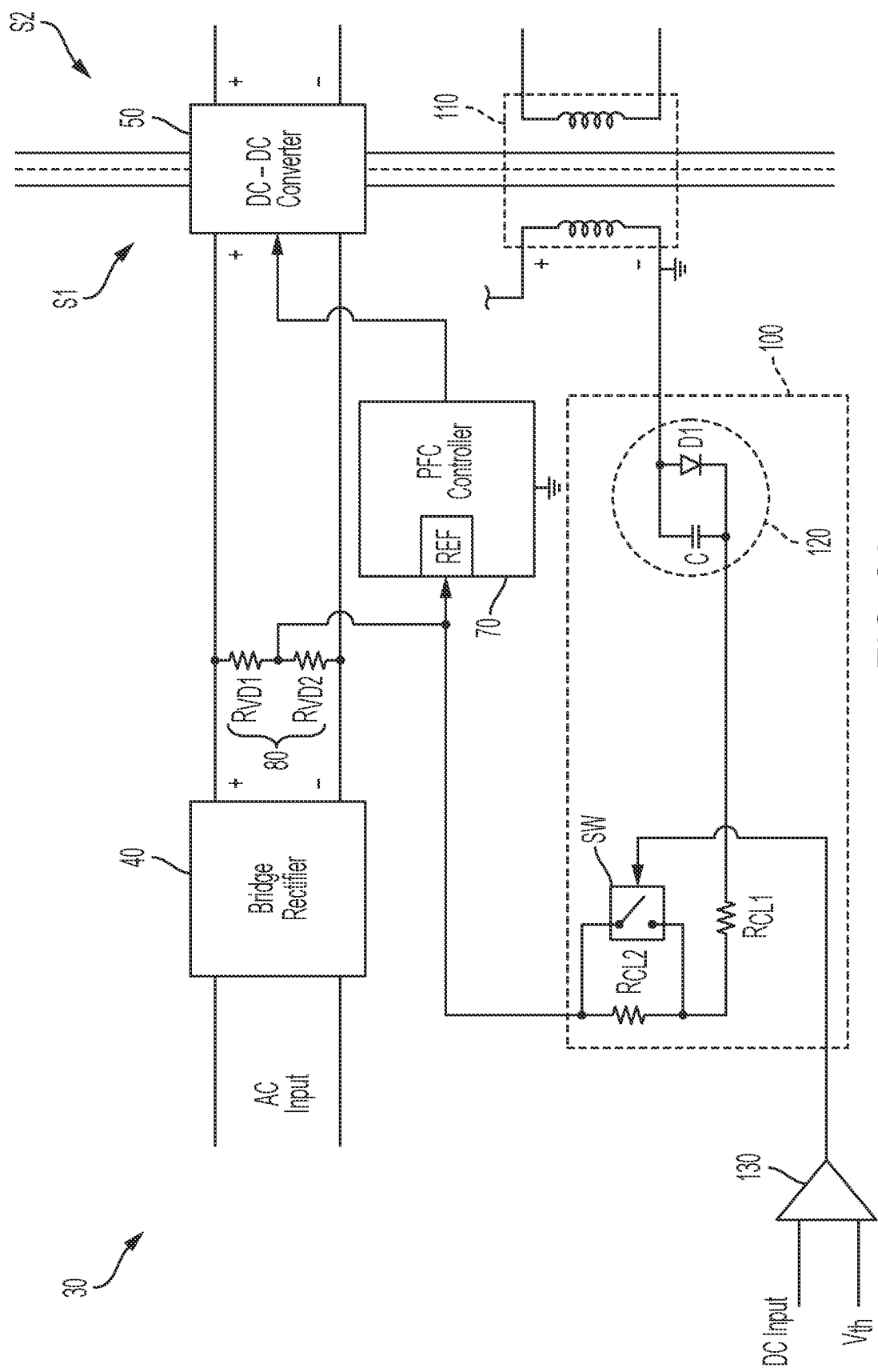
FIG. 3A illustrates a power supply system including a negative injection circuit coupled to an input of the PFC controller, according to some example embodiments of the present disclosure.
Figure 3B:
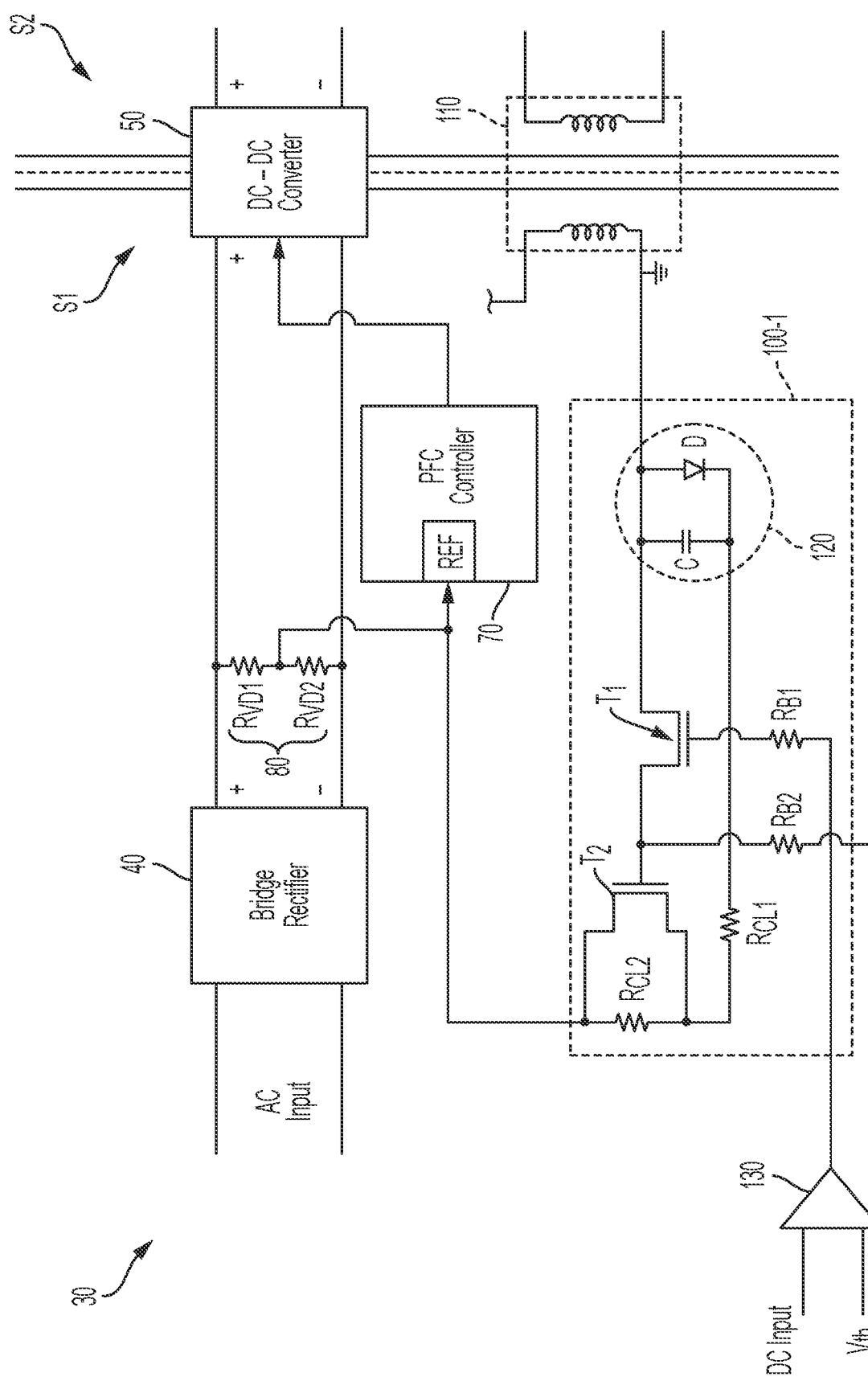
FIGS. 3B-3C illustrate a power supply system including a negative injection circuit coupled to an input of the PFC controller, according to some example embodiments of the present disclosure.
Figure 3C:
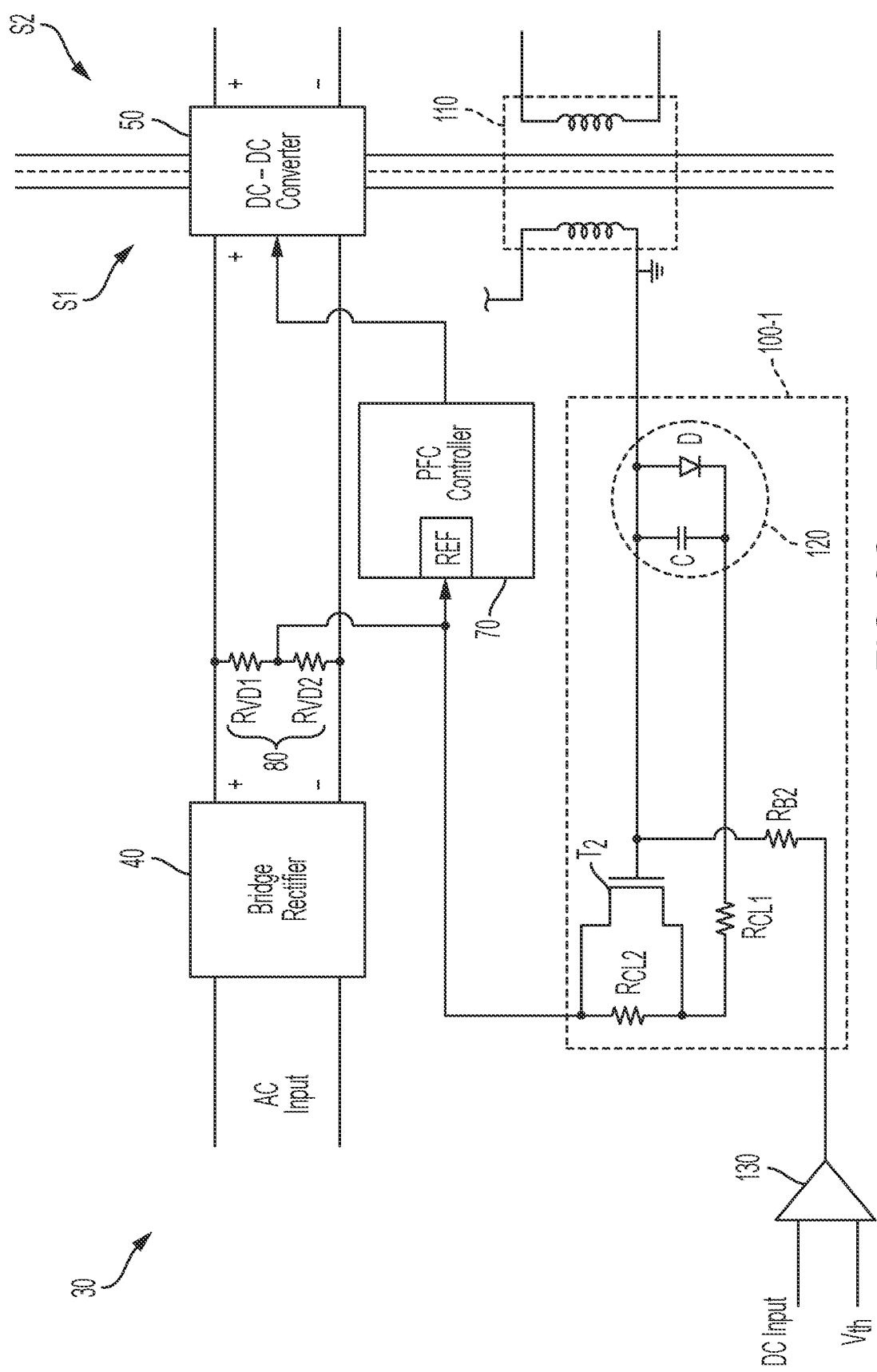

FIG. 3A illustrates a power supply system 30 including a negative injection circuit 100 coupled to an input of the PFC controller 70, according to some example embodiments of the present disclosure. FIGS. 3B-3C each illustrate a power supply system 30 including a negative injection circuit 100-1 coupled to an input of the PFC controller 70, according to some example embodiments of the present disclosure.

Referring to FIG. 3A, in some embodiments, the negative injection circuit 100 receives power from the bias windings 110, which may derive power from the output of the converter and supply power to other components of the power supply system 30 (such as the PFC controller 70, etc.) as well. The bias windings 110 may include a primary winding and a secondary winding, and the negative injection circuit 100 may be electrically coupled to the ground node of the bias windings 110 (e.g., the negative terminal of the primary winding), and use the ground voltage supplied therefrom to generate a negative voltage. The ground node may be the primary ground of the power supply system 30.

In some example, the bias windings 110 are part of the transformer of the converter 50, which received pulsed waveforms from the main switch of the converter 50. As such, the signal the ground terminal of the bias windings 110 may be pulsed (e.g., be a square wave or an AC signal). Thus, in some embodiments, the negative injection circuit 100 includes a downshifter 120 for rectifying and filtering the pulsed waveform at the ground node of the bias windings 110 to generate a negative DC voltage. According to some examples, the downshifter 120 includes a diode D having anode electrically connected to ground node, and a capacitor C connected in parallel with diode D. In addition to rectifying AC waveform, the diode D serves to produce a DC shift in its input voltage to generate a negative rectified voltage (e.g., a negative DC voltage) relative to the ground node. While the downshifter 120 illustrated in FIG. 3A has a parallel capacitor-diode configuration, embodiments of the present invention are not limited thereto, and any suitable rectifier capable of rectifying and down-shifting the ground voltage may be used.

In some embodiments, the negative injection circuit 100 further include a first current limiting resistor $R_{CL1}$ and a second current limiting resistor $R_{CL2}$ connected in series between the diode D (e.g., the cathode of diode D) and the reference pin REF of the PFC controller 70, which can form a voltage divider with the second voltage divider resistor $R_{VD2}$ and further attenuate the negative rectified voltage produced by the downshifter 120. In some embodiments, the bypass switch SW is coupled in parallel with and across the second current limiting resistor $R_{CL2}$ and is configured to selectively short across the second current limiting resistor $R_{CL2}$ (and thus bypass it) based on a signal from a ranging circuit 130. By shorting across this resistance, the magnitude of the negative injection voltage $-V_{DC}$ can be increased (i.e., the negative injection voltage $-V_{DC}$ becomes more negative). Thus, the first and second current limiting resistors $R_{CL1}$ and $R_{CL2}$ together with the bypass switch SW form a variable impedance that is configured to inject the negative injection voltage $-V_{DC}$ into the reference pin REF (or the voltage sampling input) of the PFC controller.

In some embodiments, the ranging circuit 130 compare the average or peak of the voltage at the output of the rectifier 40 with a threshold ($V_{th}$) to determine if the AC input voltage is within a first range, for example, the 100 VAC to 120 VAC range, or within a second range, for example, the 240 VAC to 277 VAC range, and produces an output signal that is low or high according to the input range. In some embodiments, when the input AC signal is within the 100 VAC to 120 VAC range, the ranging circuit 130 may output a low signal (e.g., 0 V), which deactivates (e.g., turns off or opens) the bypass switch SW and maintains the second current limiting resistor $R_{CL2}$ in the signal path from the bias windings 110 to the reference pin REF. This in turn leads to greater attenuation of the negative rectified voltage at the cathode of the diode D and a lower magnitude for the negative injection voltage $-V_{DC}$. Within this input range, the negative injection voltage may be about −0.25 V to about −0.5 V.

Further, when the input AC signal is within the 240 VAC to 277 VAC range, the ranging circuit 130 may output a high signal (e.g., 12 V), which activates (e.g., turns on or closes) the bypass switch SW and bypasses the second current limiting resistor $R_{CL2}$. This in turn leads to lower attenuation of the negative rectified voltage at the cathode of the diode D and a higher magnitude for the negative injection voltage $-V_{DC}$. Within this input range, the negative injection voltage may be about −0.5 V to about −1.0 V.

The ranging circuit 130, the bypass switch SW and the second current limiting resistor $R_{CL2}$ together ensure that negative injection voltage $-V_{DC}$ is appropriately adjusted according to the input range of the power supply system 30.

In some examples, the ratio of the resistances of the first and second voltage divider resistors $R_{VD1}$ and $R_{VD2}$ is about 50:1 to about 200:1, the ratio of the resistance of the first and second current limiting resistor $R_{CL1}$ and $R_{CL2}$ is about 1:1 to about 5:1, and the ratio of the first current limiting resistor $R_{CL1}$ to the second voltage divider resistor $R_{VD2}$ is about 1:1 to about 2:1. The aforementioned resistors may be in a range of about 100Ω to about 2 MΩ.

Referring to FIG. 3B, in some embodiments, the function of the bypass switch SW may be performed by the first and second transistors T1 and T2. In such embodiments, the gate of the first transistor T1 may be coupled to the output of the ranging circuit 130 via the first bypass resistor $R_{B1}$, and the gate of the second transistor T2 may be coupled to a power supply line via the second bypass resistor $R_{B2}$. In some examples, the power supply connected to the second bypass resistor $R_{B2}$ may also power the ranging circuit 130. The power supply may be regulated (e.g., be at about 12 V) or unregulated (e.g., range from about 12 V to about 20 V).

In some embodiments, when the ranging circuit 130 outputs a low signal (e.g., 0 V), the first transistor T1 turns off and second transistor T2 is free to turn on (by virtue of the second resistor $R_{B2}$ that is connected to a positive power supply), allowing the second current limiting resistor $R_{CL2}$ to be bypassed in the signal path from the bias windings 110 to the reference pin REF. When the output signal of the ranging circuit 130 is a high signal (e.g., 12 V), transistor T1 is turned on, which then turns off T2 by pulling the gate of T2 low (e.g., to the ground reference), thus the second current limiting resistor $R_{CL2}$ is no longer bypassed and is in the path of the negative injection signal, limiting its voltage. In some examples, the first and second transistors T1 and T2 may be n-type metal-oxide-semiconductor (NMOS) field effect transistors (FETs); however, embodiments of the present disclosure are not limited thereto, and the transistors may be p-type metal-oxide-semiconductor (PMOS) FETs, assuming the electrical connections are adjusted accordingly.

In the embodiments illustrated in FIG. 3B, the first transistor T1 is effectively used as an inverter to invert the output of the ranging circuit 130. However, embodiments of the present disclosure are not limited thereto. For example, as illustrated in FIG. 3C, the output of the ranging circuit 130 may drive the gate of the second transistor T2 without the first transistor T1 (of FIG. 3B) acting as an invertor. In such embodiments, a high signal at the output of the ranging circuit 130 bypasses the second current limiting resistor $R_{CL2}$ by turning on the second transistor T2. A low signal at the output of the ranging circuit 130 turns off the second transistor T2, thus allowing the second current limiting resistor $R_{CL2}$ to be in the signal path of the negative injection signal.

As described above, the negative injection voltage $-V_{DC}$ supplied by the negative injection circuit 100 to the reference pin of the PFC controller 70 shifts the sampled rectifier signal downward in such a way that the signal entering the reference pin is that of a shifted haversine signal which has valleys that reach zero or close to zero (e.g., as close to zero as possible). Shifting the sampled haversine signal to reach zero or substantially zero ensures that high PF and low THD can be obtained. Without the valleys reaching near zero, the PFC controller 70 may not be able to properly maintain the inductor current in phase with, or of the same fundamental frequency as, the sampled voltage signal. The amount of negative voltage injected may be automatically adjusted by sensing the AC voltage and/or AC current that enters the drivers input. Further, the circuitry serves to reduce common mode noise that enters the multiplier pin.

It will be understood that, although the terms "first", "second", "third", etc., may be used herein to describe various elements, components, regions, layers and/or sections, these elements, components, regions, layers and/or sections should not be limited by these terms. These terms are used to distinguish one element, component, region, layer or section from another element, component, region, layer or section. Thus, a first element, component, region, layer or section discussed below could be termed a second element, component, region, layer or section, without departing from the spirit and scope of the inventive concept.

The terminology used herein is for the purpose of describing particular embodiments and is not intended to be limiting of the inventive concept. As used herein, the singular forms "a" and "an" are intended to include the plural forms as well, unless the context clearly indicates otherwise. It will be further understood that the terms "include", "including", "comprises", and/or "comprising", when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. Further, the use of "may" when describing embodiments of the inventive concept refers to "one or more embodiments of the inventive concept". Also, the term "exemplary" is intended to refer to an example or illustration.

As used herein, the terms "use", "using", and "used" may be considered synonymous with the terms "utilize", "utilizing", and "utilized", respectively.

It will be understood that when an element or layer is referred to as being "on", "connected to", "coupled to", or "adjacent" another element or layer, it can be directly on, connected to, coupled to, or adjacent the other element or layer, or one or more intervening elements or layers may be present. When an element or layer is referred to as being "directly on," "directly connected to", "directly coupled to", or "immediately adjacent" another element or layer, there are no intervening elements or layers present.

As used herein, the term "substantially," "about," and similar terms are used as terms of approximation and not as terms of degree, and are intended to account for the inherent variations in measured or calculated values that would be recognized by those of ordinary skill in the art.

Also, any numerical range recited herein is intended to include all sub-ranges of the same numerical precision subsumed within the recited range. For example, a range of "1.0 to 10.0" is intended to include all subranges between (and including) the recited minimum value of 1.0 and the recited maximum value of 10.0, that is, having a minimum value equal to or greater than 1.0 and a maximum value equal to or less than 10.0, such as, for example, 2.4 to 7.6. Any maximum numerical limitation recited herein is intended to include all lower numerical limitations subsumed therein and any minimum numerical limitation recited in this specification is intended to include all higher numerical limitations subsumed therein. Accordingly, Applicant reserves the right to amend this specification, including the claims, to expressly recite any sub-range subsumed within the ranges expressly recited herein. All such ranges are intended to be inherently described in this specification.

The power supply system with the negative injection circuit and/or any other relevant devices or components according to embodiments of the present invention described herein may be implemented by utilizing any suitable hardware, firmware (e.g., an application-specific integrated circuit), software, or a suitable combination of software, firmware, and hardware. For example, the various components of the independent multi-source display device may be formed on one integrated circuit (IC) chip or on separate IC chips. Further, the various components of the LED driver may be implemented on a flexible printed circuit film, a tape carrier package (TCP), a printed circuit board (PCB), or formed on the same substrate. Further, the various components of the LED driver may be a process or thread, running on one or more processors, in one or more computing devices, executing computer program instructions and interacting with other system components for performing the various functionalities described herein. The computer program instructions are stored in a memory which may be implemented in a computing device using a standard memory device, such as, for example, a random access memory (RAM). The computer program instructions may also be stored in other non-transitory computer-readable media such as, for example, a CD-ROM, flash drive, or the like. Also, a person of skill in the art should recognize that the functionality of various computing devices may be combined or integrated into a single computing device, or the functionality of a particular computing device may be distributed across one or more other computing devices without departing from the scope of the exemplary embodiments of the present invention.

While this invention has been described in detail with particular references to illustrative embodiments thereof, the embodiments described herein are not intended to be exhaustive or to limit the scope of the invention to the exact forms disclosed. Persons skilled in the art and technology to which this invention pertains will appreciate that alterations and changes in the described structures and methods of assembly and operation can be practiced without meaningfully departing from the principles, spirit, and scope of this invention, as set forth in the following claims and equivalents thereof.

What is claimed is:

1. A negative injection circuit coupled to a power factor correction (PFC) controller of a power supply system, the negative injection circuit comprising:
    a downshifter configured to downshift a ground signal to generate a negative voltage signal; and
    a variable impedance coupled between the downshifter and the PFC controller, and configured to inject a negative injection voltage into a voltage sampling input of the PFC controller, the variable impedance comprising:
        a first current limiting resistor and a second current limiting resistor coupled in series with one another and between the downshifter and the voltage sampling input of the PFC controller; and
        a bypass switch configured to selectively short across the second current limiting resistor in response a range selection signal.

2. The negative injection circuit of claim 1, wherein the voltage sampling input of the PFC controller is configured to sample a rectified signal of a rectifier of the power supply system, and
    wherein the downshifter and the variable impedance are together configured to shift the sampled rectified signal downward by an amount of the negative injection voltage.

3. The negative injection circuit of claim 1, wherein the negative injection voltage has a value of −0.5 V to −1.0 V when the bypass switch is deactivated, and a value of −0.25 V to −0.5 V when the bypass switch is activated.

4. The negative injection circuit of claim 1, wherein the downshifter is configured to receive the ground signal from bias windings of the power supply system.

5. The negative injection circuit of claim 4, wherein the downshifter is coupled to a negative terminal of a primary binding of the bias windings, and
    wherein the bias windings are configured to derive power from an output of a converter of the power supply system.

6. The negative injection circuit of claim 1, wherein the ground signal is a pulsed signal, and
    wherein the downshifter is further configured to rectify and filter the pulsed signal to generate a negative voltage that is a DC signal.

7. The negative injection circuit of claim 1, wherein the downshifter comprises:
    a diode configured to rectify the ground signal, and having an anode configured to receive the ground signal and a cathode coupled to the first current limiting resistor; and
    a capacitor coupled in parallel to the diode and configured to filter the ground signal.

8. The negative injection circuit of claim 1, wherein the bypass switch is coupled in parallel with the second current limiting resistor.

9. The negative injection circuit of claim 1, wherein the bypass switch comprises:
    a first transistor coupled in parallel with the second current limiting resistor and having a gate resistively coupled to a ranging circuit, the first transistor being configured selectively turn on and off in response to the range selection signal from the ranging circuit; and
    a second transistor coupled between the first transistor and the downshifter and having a gate resistively coupled to a bias supply of the ranging circuit, the second transistor being configured to selectively apply the negative voltage signal from the downshifter to the gate of the first transistor in response to the range selection signal from the ranging circuit.

10. The negative injection circuit of claim 9, wherein the first and second transistors are n-type metal-oxide-semiconductor (NMOS) field effect transistors (FETs).

11. The negative injection circuit of claim 9, wherein the ranging circuit is configured to determine an AC input voltage of the power supply system as being within a first range or a second range, and to generate the range selection signal according to the determination.

12. The negative injection circuit of claim 11, wherein the first range is 100 VAC to 120 VAC, and the second range is 240 VAC to 277 VAC,
    wherein when the AC input voltage is within the first range, the range selection signal has a first value, and when the AC input voltage is within the second range, the range selection signal has a second value, and
    wherein the bypass switch is configured to deactivate in response to the range selection signal having the first value, and to activate to short across the second current limiting resistor in response to the range selection signal having the second value.

13. The negative injection circuit of claim 1, wherein a ratio of resistances of the first and second current limiting resistor is 1:1 to 2:1.

14. A power supply system comprising:
a power factor correction (PFC) controller configured to reduce a total harmonic distortion and increase a power factor of the power supply system, and having a voltage sampling input configured to sample a rectified signal of a rectifier of the power supply system, and
a negative injection circuit coupled to the PFC controller and comprising:
a downshifter configured to downshift a ground signal to generate a negative voltage signal; and
a variable impedance coupled between the downshifter and the PFC controller, and configured to inject a negative injection voltage into the voltage sampling input of the PFC controller, the variable impedance comprising:
a first current limiting resistor and a second current limiting resistor coupled in series with one another and between the downshifter and the voltage sampling input of the PFC controller; and
a bypass switch configured to selectively short across the second current limiting resistor in response a range selection signal.

15. The power supply system of claim 14, further comprising:
The rectifier configured to rectify an AC input signal to generate the rectified signal.

16. The power supply system of claim 14, wherein the downshifter and the variable impedance are together configured to shift the sampled rectified signal downward by an amount of the negative injection voltage.

17. The power supply system of claim 14, further comprising:
a converter coupled to the PFC controller; and
bias windings are configured to derive power from an output of the converter of the power supply system, and having a primary winding and a secondary winding,
wherein the downshifter is configured to receive the ground signal from a negative terminal of the primary winding.

18. The power supply system of claim 14, wherein the ground signal is a pulsed signal, and
wherein the downshifter is further configured to rectify and filter the pulsed signal to generate a negative voltage that is a DC signal.

19. The power supply system of claim 14, wherein the downshifter comprises:
a diode configured to rectify the ground signal, and having an anode configured to receive the ground signal and a cathode coupled to the first current limiting resistor; and
a capacitor coupled in parallel to the diode and configured to filter the ground signal.

20. The power supply system of claim 14, further comprising:
a ranging circuit configured to determine an AC input voltage of the power supply system as being within a first range or a second range, and to generate the range selection signal according to the determination,
wherein the first range is 100 VAC to 120 VAC, and the second range is 240 VAC to 277 VAC,
wherein when the AC input voltage is within the first range, the range selection signal has a first value, and when the AC input voltage is within the second range, the range selection signal has a second value, and
wherein the bypass switch is configured to deactivate in response to the range selection signal having the first value, and to activate to short across the second current limiting resistor in response to the range selection signal having the second value.

* * * * *

UNITED STATES PATENT AND TRADEMARK OFFICE
CERTIFICATE OF CORRECTION

PATENT NO. : 11,528,789 B2
APPLICATION NO. : 17/393901
DATED : December 13, 2022
INVENTOR(S) : Michael Archer et al.

It is certified that error appears in the above-identified patent and that said Letters Patent is hereby corrected as shown below:

On the Title Page

| | |
|---|---|
| Column 2, (Item (57)) Abstract, Line 13 | After "response" insert --to-- |

In the Claims

| | |
|---|---|
| Column 11, Claim 1, Line 62 | After "response" insert --to-- |
| Column 13, Claim 14, Line 25 | After "response" insert --to-- |
| Column 13, Claim 15, Line 29 | Delete "The" and Insert --the-- |

Signed and Sealed this
Twenty-fifth Day of April, 2023

Katherine Kelly Vidal
*Director of the United States Patent and Trademark Office*